(12) United States Patent
Page

(10) Patent No.: US 7,509,922 B2
(45) Date of Patent: Mar. 31, 2009

(54) CONTAINMENT PENS FOR FINFISH AQUACULTURE

(75) Inventor: Stephen H. Page, Searsmont, ME (US)

(73) Assignee: Ocean Farm Technologies, Inc., Searsmont, ME (US)

(*) Notice: Subject to any disclaimer, the term of this patent is extended or adjusted under 35 U.S.C. 154(b) by 0 days.

(21) Appl. No.: 11/851,625

(22) Filed: Sep. 7, 2007

(65) Prior Publication Data
US 2008/0000429 A1 Jan. 3, 2008

Related U.S. Application Data

(63) Continuation of application No. 10/976,641, filed on Oct. 29, 2004, now Pat. No. 7,284,501.

(51) Int. Cl.
A01K 63/00 (2006.01)
(52) U.S. Cl. ..................................... 119/223
(58) Field of Classification Search ............... 119/223, 119/215, 216, 219; 43/102, 103, 105, 7, 43/8
See application file for complete search history.

(56) References Cited

U.S. PATENT DOCUMENTS

| | | | | |
|---|---|---|---|---|
| 1,054,880 A | * | 3/1913 | Svoboda ...................... 43/105 |
| 4,244,323 A | | 1/1981 | Morimura |
| 4,257,350 A | * | 3/1981 | Streichenberger ........... 119/223 |
| 4,312,296 A | | 1/1982 | Stelleman et al. |
| 4,380,213 A | | 4/1983 | Blair et al. |
| 4,957,064 A | | 9/1990 | Koma |
| 5,172,649 A | * | 12/1992 | Bourgeois .................... 119/223 |
| 5,207,017 A | | 5/1993 | Litrico |
| 5,251,571 A | * | 10/1993 | Willinsky et al. ........... 119/215 |
| 5,299,530 A | | 4/1994 | Mukadam et al. |
| 5,412,903 A | | 5/1995 | Zemach et al. |
| 5,438,958 A | * | 8/1995 | Ericsson et al. ............. 119/223 |
| 5,549,076 A | | 8/1996 | Kaarstad |
| 5,617,813 A | * | 4/1997 | Loverich et al. ............ 119/223 |
| 5,628,279 A | * | 5/1997 | Bones, IV .................... 119/215 |
| 5,713,303 A | | 2/1998 | Willinsky et al. |

(Continued)

FOREIGN PATENT DOCUMENTS

EP 0060792 9/1982

(Continued)

OTHER PUBLICATIONS

Net Systems (Washington), The Submersible Sea Station™, www.oceanspar.com/seastation.htm, 2004, printed from Internet Nov. 29, 2004.

(Continued)

Primary Examiner—Yvonne R. Abbott
(74) Attorney, Agent, or Firm—Fish & Richardson P.C.

(57) ABSTRACT

A containment pen for finfish aquaculture, comprising a supporting structure, a net attached to the supporting structure and defining a containment volume for containing finfish, wherein the net comprises a plurality of removable net panels, wherein each of the removable net panels comprises a discrete piece of flexible netting attached along its perimeter to one or more substantially rigid members, and wherein the removable net panels are configured to be removable from the containment pen with the piece of flexible netting remaining attached to the substantially rigid members.

9 Claims, 18 Drawing Sheets

U.S. PATENT DOCUMENTS

| | | | |
|---|---|---|---|
| 6,216,635 B1 * | 4/2001 | McRobert | 119/201 |
| 6,386,146 B1 | 5/2002 | Knott, Sr. | |
| 6,481,378 B1 * | 11/2002 | Zemach | 119/223 |
| 6,520,115 B2 | 2/2003 | Boyd | |
| 2006/0096548 A1 * | 5/2006 | Ytterland et al. | 119/223 |

FOREIGN PATENT DOCUMENTS

| | | |
|---|---|---|
| FR | 2531835 | 2/1984 |
| FR | 2533112 | 3/1984 |
| GB | 1436125 | 5/1976 |
| GB | 2031251 | 4/1980 |
| GB | 2078473 | 1/1982 |
| WO | 89/12388 | 12/1989 |
| WO | 92/03921 | 3/1992 |
| WO | 93/06720 | 4/1993 |
| WO | 95/14374 | 6/1995 |
| WO | 2004/073396 | 9/2004 |

OTHER PUBLICATIONS

Net Systems (Washington), Raccolta casi Working Model visualNastran—NETSystems, www.atnet.it/lista/casnets.htm, printed from Internet Nov. 29, 2004.

Farmocean International (Sweden), Open the Door to Industrial Offshore Aqua Culture, www.farmocean.se/indexA.htm, printed from Internet Nov. 29, 2004.

Bonnar Engineering/Dunlop Oil and Marine (Ireland), Dunlop Tempest, www.bonnarenglid.ie/marine.htm, printed from Internet Nov. 30, 2004.

Sadco-Shelf Ltd. (Russia), Products Brochure, (Nov. 20, 2000), www.sadco-shelf.sp.ru/english/ep02_pr.htm, printed from Internet Nov. 30, 2004.

* cited by examiner

CONTAINMENT PENS FOR FINFISH AQUACULTURE

CROSS-REFERENCE TO RELATED APPLICATION

This application is a continuation application of and claims priority to U.S. application Ser. No. 10/976,641, filed on Oct. 29, 2004 now U.S. Pat. No. 7,284,501.

TECHNICAL FIELD

This invention relates to containment pens for marine finfish aquaculture.

BACKGROUND

Marine finfish aquaculture uses pens to contain the finfish and to prevent access by predators. A typical pen consists of a net suspended at the surface by a floating structure (e.g., a circular plastic collar). The walls of the net extend vertically from the water's surface to a depth of typically 6 to 20 meters, and then across the bottom of the pen.

Over the past 30 years, the size of containment pens has increased. Early containment pens were 40 meters in circumference (or 15 meter square). Today's standard containment pen is 100 meters in circumference, with a volume of 6,000 to 20,000 cubic meters. A single aquaculture farm operation can have 30 of these circular pens.

The nets used in these pens are huge. Dry, they weigh several tons and at the end of a growing cycle they can weigh 20 tons or more owing to fouling from marine organisms such as algae and mussels. The handling of these huge nets for repair and maintenance has become a huge logistical and economic problem for fish farmers. Too bulky and heavy to handle, nets must be cut off the pens, often ending up on the ocean bottom where, according to newly issued discharge permits, they must be recovered.

Suspended nets are subject to deformation from currents, sagging, and bagging. This can result in pockets where predators such as seals can push in to bite fish, with resulting tears to the net. Therefore, these pens need a predator net, a secondary, coarser net entirely encapsulating the containment net. The predator net is typically suspended from the outside of the floating circular collar, and the containment net from the inside of the collar, to keep a one meter separation between predator and containment nets. This is generally believed to be sufficient to keep predators from pushing into the containment net.

A third net has to be incorporated into the current technology—a bird net is suspended above the surface pens to prevent access to the pens by predator birds, e.g., osprey, eagles, herons, and gulls.

Suspended net systems are generally located nearshore, where sea conditions (e.g., waves and winds) are less severe, and access is easier. But offshore locations are known to have advantages. Water depths are greater, thus permitting the containment pens to be submerged during storm conditions when fish would naturally move to greater depths to avoid damage from wave action. Water quality is generally better, as there is less pollution from land sources. The containment pens have a much reduced aesthetic presence, and thus face less political opposition. Greater water circulation through the pens helps dilute waste products. Water temperatures are more stable. Risk of disease is reduced due to increased distance between farms.

Notwithstanding the known advantages of offshore locations, the art has not yet found a practical design for offshore containment pens, although various ideas have been advanced.

Willinsky U.S. Pat. No. 5,251,571 shows an offshore containment pen in the shape of a geodesic sphere formed of hubs and interconnecting struts. Two hemispheric nets are attached to the interior of the sphere, by attaching the net at many points (col. 4, lines 3-18). The sphere can be lowered below the ocean surface, and it can rotated at the surface using an axle and buoyant elements incorporated into the sphere.

Zemach U.S. Pat. No. 5,412,903 proposes a metal skeleton with a superimposed netting covering the skeleton.

Bones U.S. Pat. No. 5,628,279 shows fish cages designed to be raised and lowered along the submerged support columns of offshore oil platforms. The pens rely on injection-molded, fiberglass-reinforced grating panels painted with antifouling paint. The grating panels are supported in a rigid, generally hexagonal structure. An optional net may be installed if the fish are too small to be contained by the grating panels. Loverich U.S. Pat. No. 7,617,813 (Ocean Spar Technologies) discloses a submersible pen having a central vertical spar and a peripheral ring, with a net stretched around the peripheral ring to the two ends of the spar. Similar structures are in use in various locations, and pens as large as 3,000 cubic meters have been constructed. E.g., the Submersible Sea Station from Net Systems.

Sadco, a Russian company, has proposed a submerged metal cage from which a net is hung.

Another approach to offshore pens has been to strengthen the design of surface pens. E.g., the Dunlop Tempest pen uses flexible rubberized flotation collars filled with gas at high pressure supporting gravity nets. The pens have been used in Ireland for salmon, and have survived substantial storms. The Ocean Spar pen by Net Systems uses tensioned vertical steel spars supporting gravity nets. Farmocean proposes a galvanized steel superstructure supporting gravity nets.

Another issue in the design of containment pens is moving fish between pens or harvesting fish from pens. Conventional approaches are extremely labor intensive, and stressful for the animals. Workers use a seine net to crowd the fish to one side of a pen and then use a fish pump or brail net to move the fish. Often many sets of the seine are needed to capture the fish, and this operation cannot be done in rough weather. The fish are stressed from crowding, and often physically injured (scale loss, bruising, loss of protective slime) from the nets and the fish pump. The injuries lead to eventual mortality or downgrading at harvest.

SUMMARY

In a first aspect, the invention features a containment pen for finfish aquaculture, comprising a supporting structure, a net attached to the supporting structure and defining a containment volume for containing finfish, wherein the net comprises a plurality of removable net panels, wherein each of the removable net panels comprises a discrete piece of flexible netting attached along its perimeter to one or more substantially rigid members, and wherein the removable net panels are configured to be removable from the containment pen with the piece of flexible netting remaining attached to the substantially rigid members.

Preferred implementations of this aspect of the invention may incorporate one or more of the following: The net panels may provide the supporting structure for a majority of the containment pen. The net panels may be in the shape of a polygon. The substantially rigid members may comprise structural beams, and the net panels may comprise at least three beams joined at their ends to define the polygonal shape. Adjoining net panels may be attached by fastening together adjoining beams. The panels may be shaped so that a beam of one panel extends generally parallel to and adjacent a beam of an adjoining panel, and the two adjacent beams may be attached by fasteners. The fasteners may be removable to permit a panel to be removed from the pen. The pen may be substantially spherical. The pen may be a geodesic structure. The panels may comprise one or more triangular panels making up the geodesic structure. The discrete pieces of flexible netting may be tensioned generally in a plane defined by the one or more substantially rigid members. The containment pen may further comprise flotation members supported on at least some of the beams. The flotation members may comprise fixed flotation members sized to provide substantially neutral buoyancy to the containment pen. The flotation members may comprise inflatable flotation members sized and positioned to permit the pen to be rotated to a selected position by selective inflation of the inflatable members.

In a second aspect, the invention features a containment pen for finfish aquaculture, comprising a supporting structure, a net attached to the supporting structure and defining a containment volume for containing finfish, wherein the supporting structure comprises a plurality of removable panels, and wherein the removable panels make up a majority of the supporting structure.

Preferred implementations of this aspect of the invention may incorporate one or more of the following: The removable panels when attached to adjoining removable panels may provide the structural integrity of the majority of the supporting structure. The removable panels may be in the shape of a polygon. The removable panels may comprise at least three beams joined at their ends to define the polygonal shape. Adjoining net panels may be attached by fastening together adjoining beams. The panels may be shaped so that a beam of one panel extends generally parallel to and adjacent a beam of an adjoining panel, and the two adjacent beams may be attached by fasteners. The fasteners may be removable to permit a panel to be removed from the pen. The pen may be substantially spherical. The pen may be a geodesic structure. The panels may comprise one or more triangular panels making up the geodesic structure. The containment pen may further comprise flotation members supported on at least some of the beams. The flotation members may comprise fixed flotation members sized to provide substantially neutral buoyancy to the containment pen. The flotation members may comprise inflatable flotation, members sized and positioned to permit the pen to be rotated to a selected position by selective inflation of the inflatable members.

In a third aspect, the invention features a containment pen for finfish aquaculture, comprising a supporting structure, a net attached to the supporting structure and defining a containment volume for containing finfish, wherein the net comprises a plurality of net pieces separate from other net pieces, wherein each of the plurality of net pieces is attached along its perimeter to one or more substantially rigid members, and wherein the net pieces are tensioned generally in a plane defined by the one or more substantially rigid members.

Preferred implementations of this aspect of the invention may incorporate one or more of the following: The substantially rigid members may define the perimeters of polygons across which the net pieces are tensioned. The polygons may be joined to form a pen that is substantially a geodesic structure with net stretched tightly across geodesic panels. The net pieces may be attached along the length of the substantially rigid members by trapping the perimeters of the net pieces within keyways running along the rigid members.

In a fourth aspect, the invention features containment pens and fish transfer apparatus for finfish aquaculture, comprising at least a first and a second containment pen, each of the first and second containment pens, comprising a supporting structure, a net attached to the supporting structure and defining a containment volume for containing finfish, and an underwater aperture in the net that can be selectively opened or closed; a fish transfer conduit configured to be connected to the underwater aperture of the first and the second pen, to provide an underwater fish transfer conduit for transferring fish under their own locomotion between the first and second pens; and a structure for reducing the volume of the first containment pen available to the fish to encourage fish to transfer from the first pen to the second pen by swimming through the fish transfer conduit.

Preferred implementations of this aspect of the invention may incorporate one or more of the following: The structure for reducing the volume of the first containment pen available to the fish comprises may be an expandable member that progressively fills the interior of the first pen. The expandable member may comprise a balloon element that may be filled with water or gas or a combination of gas and water. The aperture may be positioned in a panel that replaces a removable net panel of the containment pen.

In a fifth aspect, the invention features a method of transferring fish between containment pens in finfish aquaculture, the method comprising connecting a fish transfer conduit to an underwater aperture in the first and in the second containment pen, to provide an underwater fish transfer conduit for transferring fish under their own locomotion between the first and second pens; and reducing the volume of water available in the first pen to encourage fish to transfer from the first pen to the second pen by swimming through the fish transfer conduit.

Preferred implementations of this aspect of the invention may incorporate one or more of the following: Reducing the volume of water available in the first pen may comprise progressively raising the first pen partially above the surface of the water. The first pen may be raised above the surface of the water by progressively increasing the amount of gas contained in flotation chambers within portions of the first pen. Reducing the volume of water available in the first pen may comprise expanding the volume within the first pen occupied by an expandable member. The expandable member may be a balloon element that is filled with gas or water or a combination of gas and water.

In a sixth aspect, the invention features a containment pen for finfish aquaculture, comprising a generally spherical supporting structure, a net attached to the supporting structure and defining a generally spherical containment volume for containing finfish, and inflatable elements positioned at a plurality of locations around the supporting structure, wherein the inflatable elements are sized and positioned so that inflation of selected ones of the inflatable elements has the effect of rotating the pen to a selected orientation.

Preferred implementations of this aspect of the invention may incorporate one or more of the following: The containment pen may further comprise pneumatic lines for delivering inflation air to the selected ones of the inflatable elements. The supporting structure may comprise a plurality of interconnected beams, and the inflatable elements may be contained substantially within the interiors of the beams.

Among the many advantages of the invention (some of which may be achieved only in some of its various aspects and implementations) are that the containment net is divided into pieces of manageable size; thus permitting individual pieces to be inspected, removed, replaced, or repaired on a regular maintenance schedule. The containment net can be stretched tightly enough to make a predator net unnecessary, and to allow the pen to be towed when stocked with fish. A separate bird net is also not necessary, as the net panels serve as bird netting when above the surface of the water. Fewer parts are required to construct the pen, as many of the panels and net pieces are identical. The resulting pen has great strength for its weight, particularly in the case of the panels forming a geodesic sphere. The pens can be manufactured at relatively low cost, as the parts can be prefabricated in a factory, and assembled on the site of the aquaculture facility. Assembly and disassembly at sea is possible. Different size pens can be manufactured from the same basic parts. The pen can be rotated to bring different panels to the surface for access, inspection, maintenance, repair, or replacement. A panel or group of panels can be removed without loss of fish, as a panel or group of panels needing to be removed can be brought above the water surface. Fish can be transferred between pens under their own locomotion, with less stress on the fish. Containment pens retain their shape and volume regardless of the forces imposed by currents. Other features and advantages of the invention will be found in the detailed description, drawings, and claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
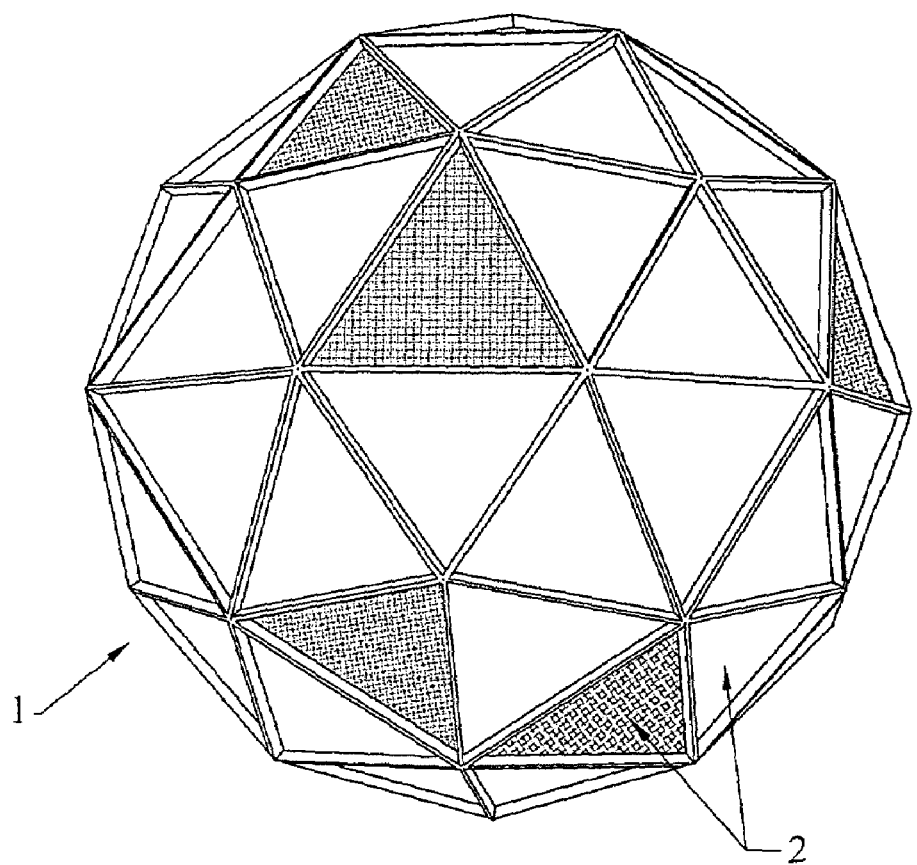
FIG. 1 is a perspective view of one possible implementation of the invention.
Figure 2:
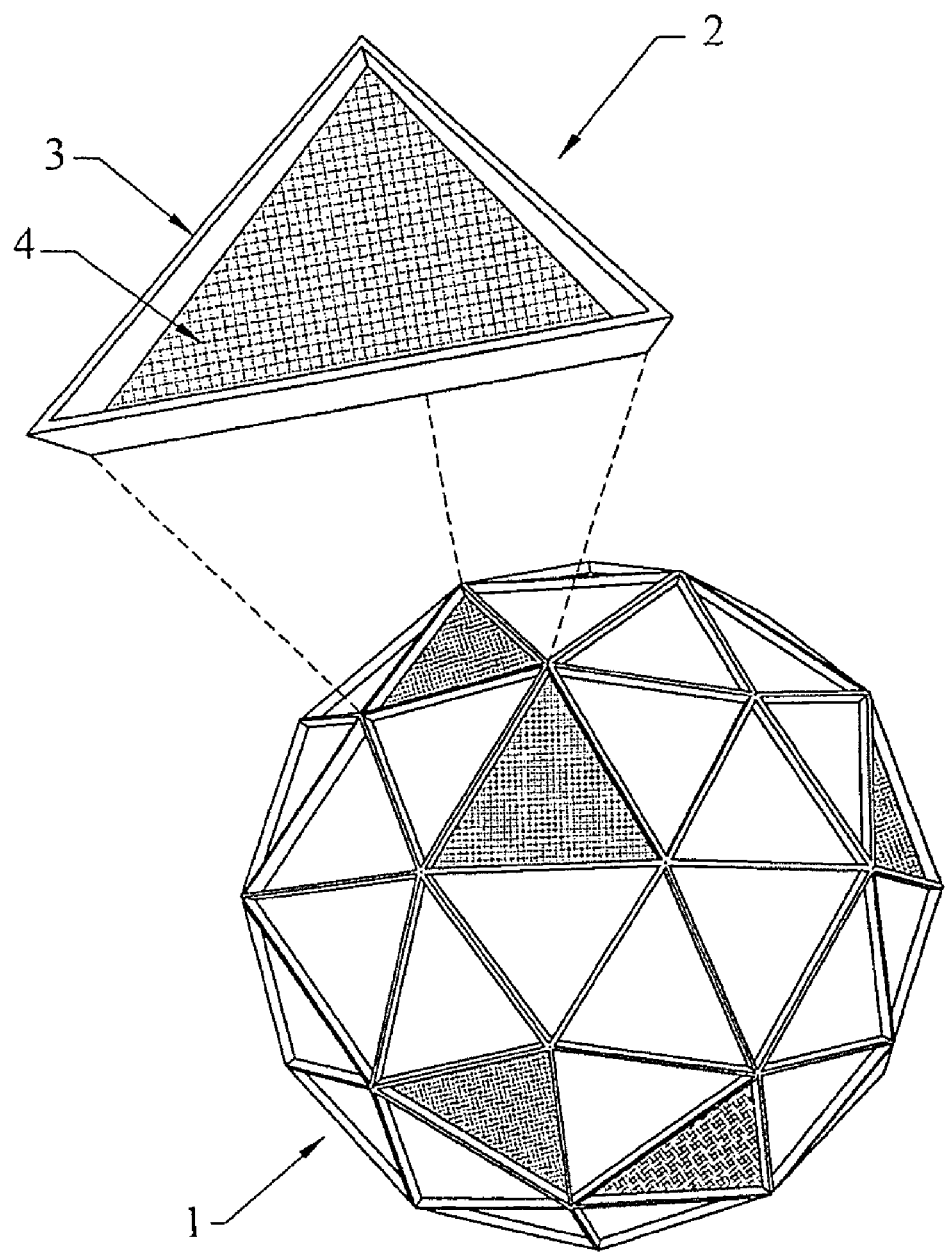
FIG. 2 is a perspective view of the implementation of FIG. 1 with one panel enlarged for clarity.

FIG. 1 shows a finfish containment pen 1 having a plurality of individual net panels 2, which when fastened together, form a generally spheroid geodesic structure about 30 meters in diameter. The pen may vary in shape and size, and need not be a geodesic structure. FIG. 2 shows an enlargement of one net panel 2, which is formed by joining three side beams 3 and netting 4. In the 30 meter pen shown in FIGS. 1-2, there are 80 separate and distinct net panels. Larger pens could be assembled using the same panels, e.g., pens having 180, 320, or up to 720 panels.

Figure 3:
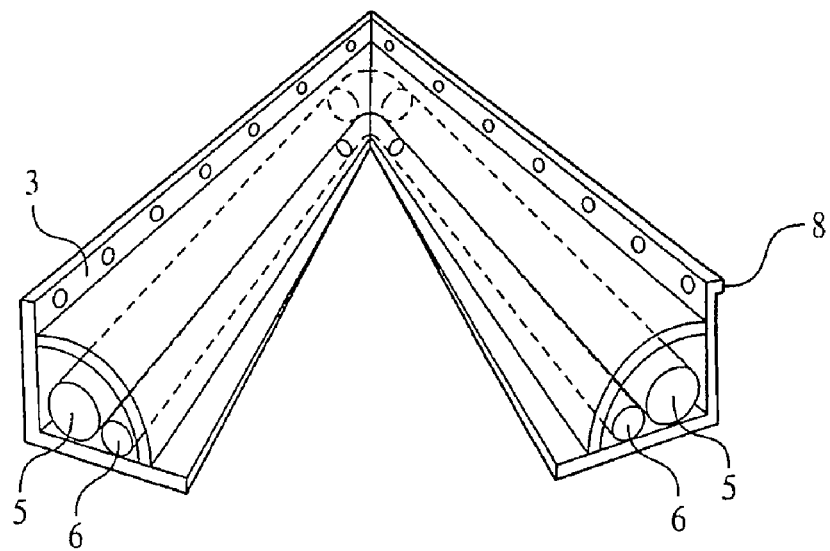
FIG. 3 is a perspective, cross-sectional view through the structure of a panel.

The structure of a net panel is shown in more detail in FIG. 3. Each side beam 3 may be formed from an extruded member shaped to the proper angles according to the desired geometry of the pen. The side beam 3 could be made from extruded plastic or aluminum, or it could be fabricated, for example by welding or otherwise adhering individual pieces of material (e.g., by welding steel). Beams may be joined at their junctions by welding (e.g., HDPE or metal can be readily welded) or using another fastening technique. Fixed foam flotation 6 could be added internally to beam 3, in sufficient amounts to give the panel neutral buoyancy. An inflatable flotation tube 5, made of a fabric material such as Hypalon™ could also be added internally to beam 3.

Figure 4:
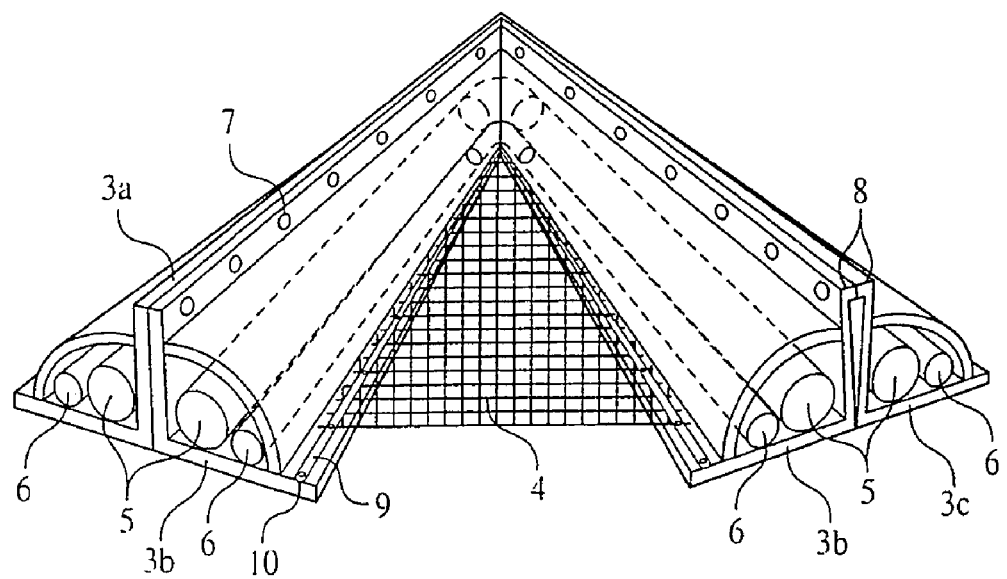
FIG. 4 is a perspective, cross-sectional view showing the attachment of one panel to adjoining panels.

FIG. 4 shows two adjoining net panels attached to the net panel of FIG. 3. Beam 3a of a first adjoining net panel is fastened to one of beams 3b of the center net panel. Beam 3c of a second adjoining net panel is fastened to the other of beams 3b. Bolts 7 or another type of fastener are used to attach the adjoining beams 3a, 3b 3c. A piece of netting 4, which may vary in mesh size according to the size of the fish contained in the pen 1, is secured to beams 3b by a strip of metal or plastic 9 which is fastened in slot 10 in each beam. Many other techniques can be used for securing the perimeter of the netting. FIG. 4 shows only a portion of two beams of a panel. Typically, all beams of a panel (e.g., all three for a triangular panel) would be attached to adjoining panels, and to the piece of netting 4, in the same manner shown.

FIG. 4 shows an alternative extrusion detail for beams 3b and 3c, in which a flange 8 is provided that both strengthens the beam and, due to the clamping action of the bolt 7 below the flange, advantageously forces the interior joint of beams 3b and 3c closed. The additional flange 8 could also be used to attain a dihedral angle from a stock 90 degree angle extrusion.

Figure 5A:
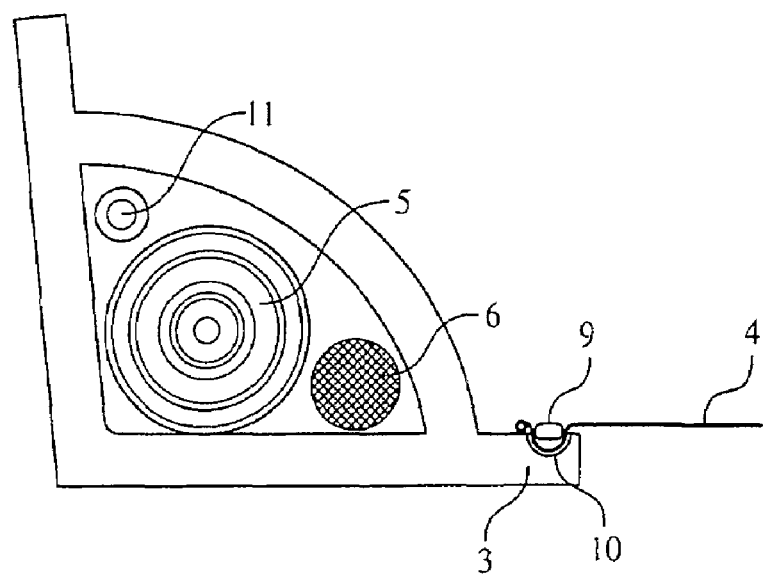
FIGS. 5A-5C are cross-sectional views through different possible panel beams.

FIG. 5A shows a cross section through one of beams 3. The fixed foam flotation member 6, the inflatable flotation tube 5, and a pneumatic pressure line 11 for supplying flotation gas (e.g., air) to the inflatable flotation tube 5 are installed internally within the extruded beam 3. None of these three members is necessary, and each may be provided without the other. The extruded beam is segmented along its length (not shown), so that flotation member 6, flotation tube 5, and line 11 are surrounded by water when the pen is submerged.

Figure 5B:
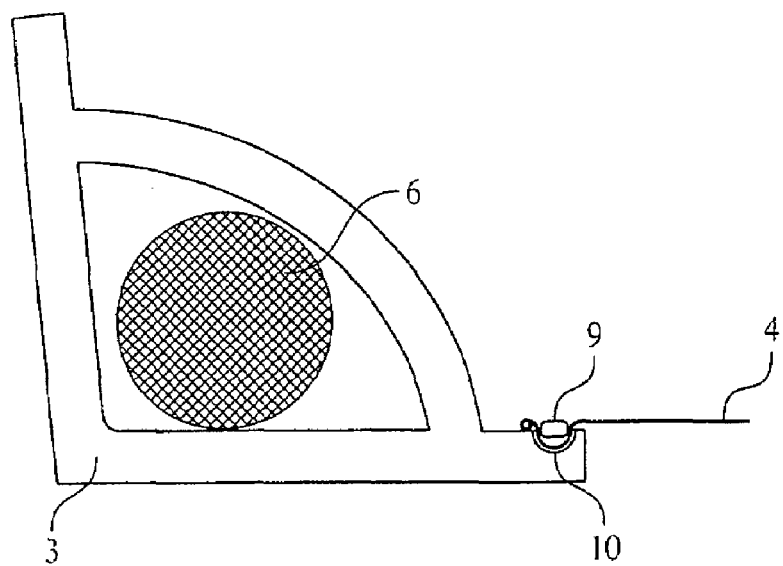

If a pneumatic line 11 is provided, it may be connected through valves (not shown) to the inflatable flotation tubes 5, and pneumatic connections may be made between net panels with quick connect air couplings (not shown). Even if flotation tubes 5 and pneumatic lines 11 are used, it is not necessary that they be used in all panels. Some of the net panels 2 may have side beams with only fixed flotation 6 as shown in FIG. 5B. And some panels may have neither fixed nor inflatable flotation members.

Figure 5C:
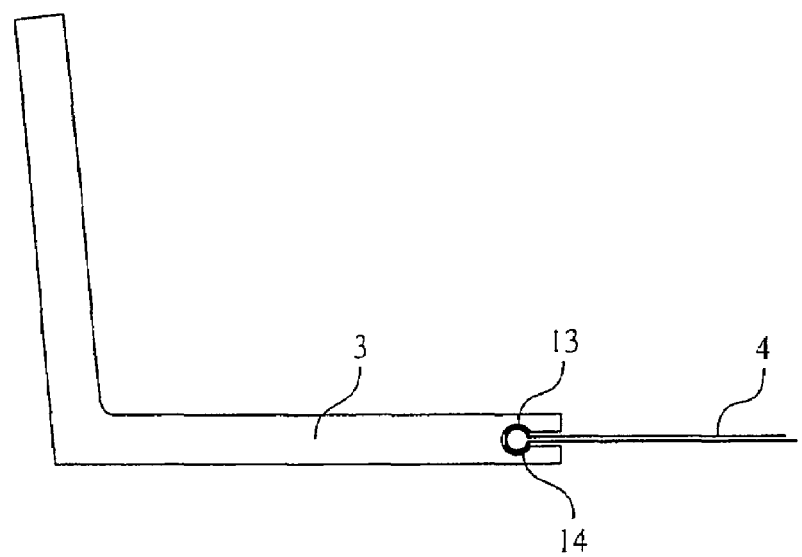

Another implementation of a side beam 3 of the net panel 2 is shown in FIG. 5C. In this case, the side beam has no separate flotation member, and relies for flotation only on that inherent in the material used for construction. Depending on the material used for the beams, it may not necessary or desirable to provide separate flotation members, or flotation could be provided by members external to the panels (not shown), or by special flotation panels that replace net panels (not shown).

FIG. 5C also shows an alternative technique for fastening the pieces of netting 4 to the side beam 3 of the net panel 2. In this case, the netting 4 is sewn with a bolt rope 14 around the perimeter of the net 4, the bolt rope 14 is threaded through a key-shaped slot 13 which runs the entire length of the tangential section of beam 3.

Figure 5D:
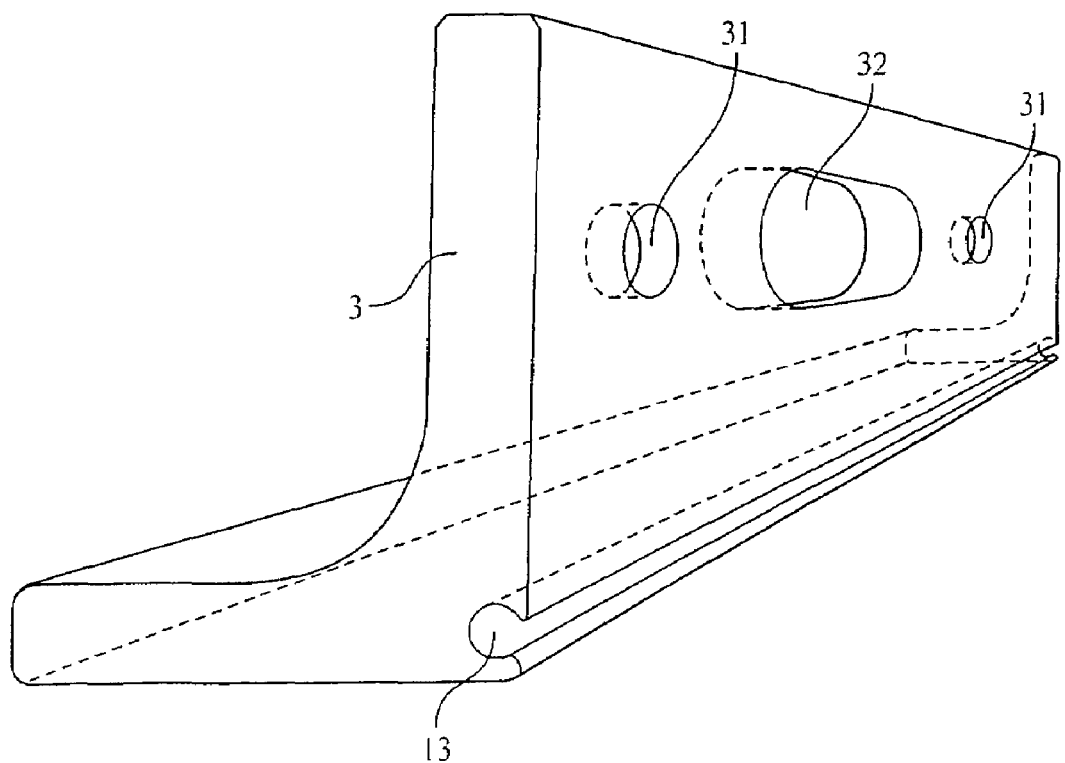
FIGS. 5D-5E are perspective views of possible panel beams.

FIG. 5D is a perspective view showing a side beam 3 in which a key shaped slot 13 is molded into the edge of beam 3. Holes 31 in the beam 3 are configured to receive a through fastener to connect two adjacent net panels (e.g., as shown in more detail in FIG. 5H). A handhold 32 is provided for allowing a person to securely grasp the beam 3 when working on the containment pen.

Figure 5E:
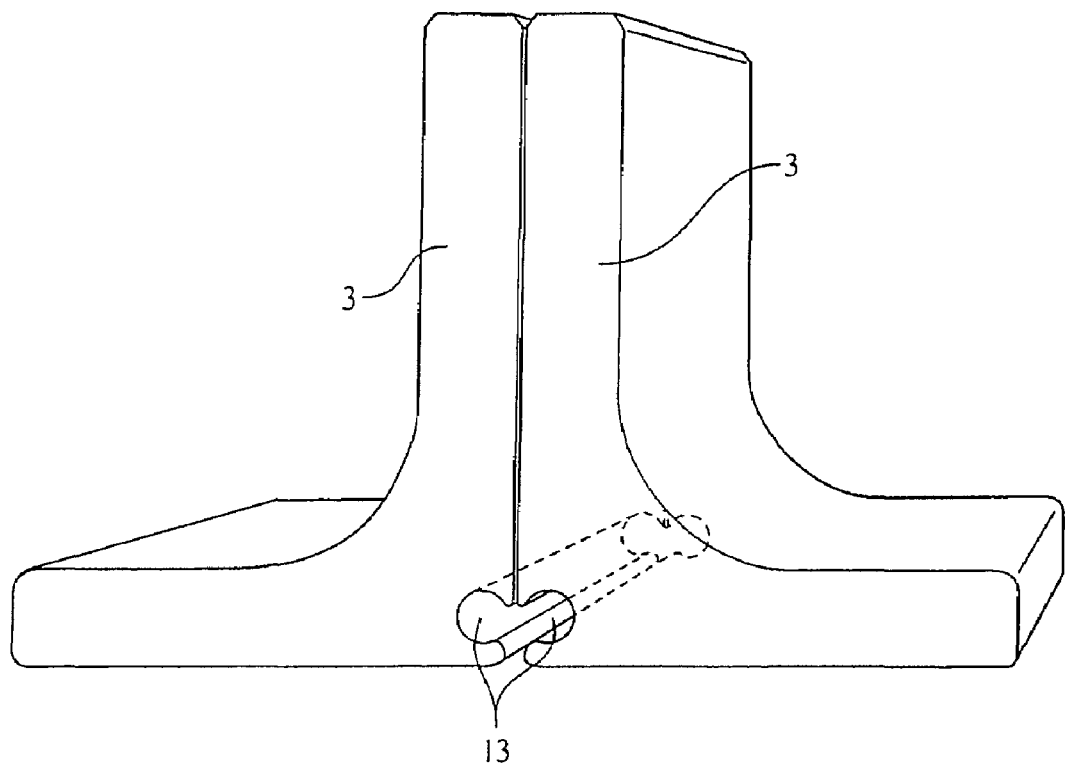

FIG. 5E shows two beams 3 of the type shown in FIG. 5D, with the beams positioned as they would be after being fastened together (but without fasteners shown).

Figure 5F:
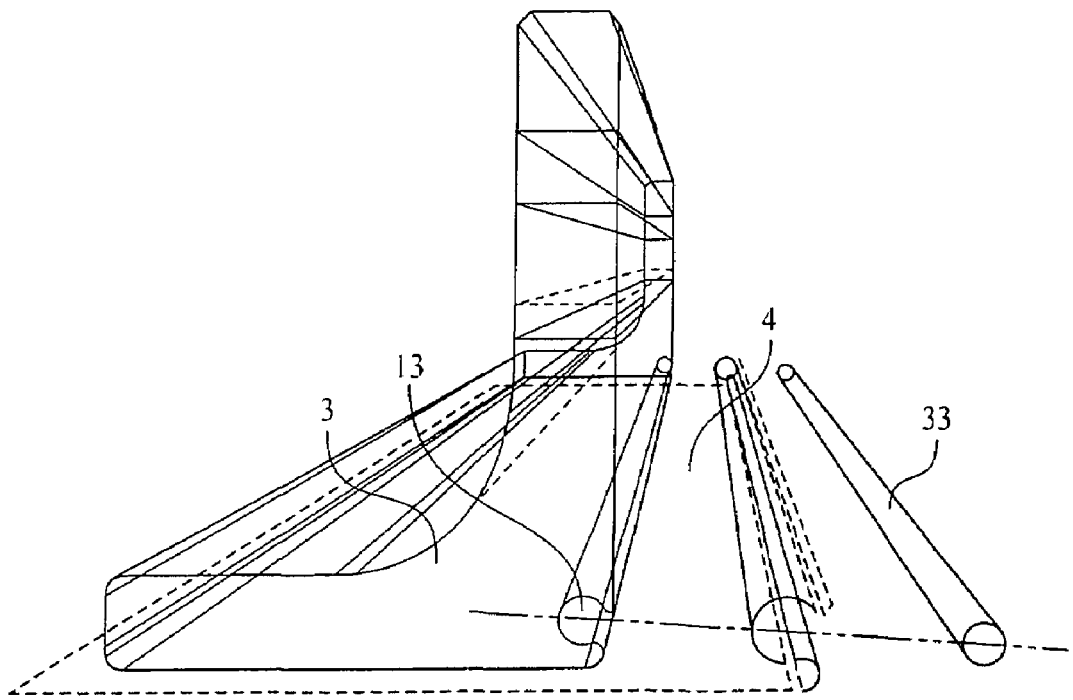
FIG. 5F is a perspective view showing the manner of installing netting to a panel beam.
Figure 5G:
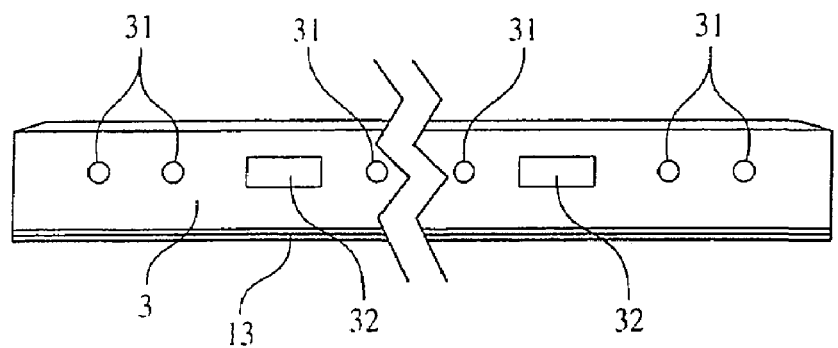
FIG. 5G is an elevation view showing the fastening holes and handholds along a panel beam.

FIG. 5G is an elevation view of beam 3 of FIG. 5D, showing connector holes 31 and handholds 32 spaced along the beam 3 in such a way as to mate with adjacent net panels.

FIG. 5F is a perspective view showing one of many possible net attachment techniques. The netting 4 is stretched over the net panel side beam 3, and a flexible plastic or rubber strip 33 is forced into the key slot 13 in order to retain the net. An advantage of this technique is that when panels 2 are fastened together (as shown in FIG. 5E), the net retaining strips 33 cannot be removed.

Figure 5H:
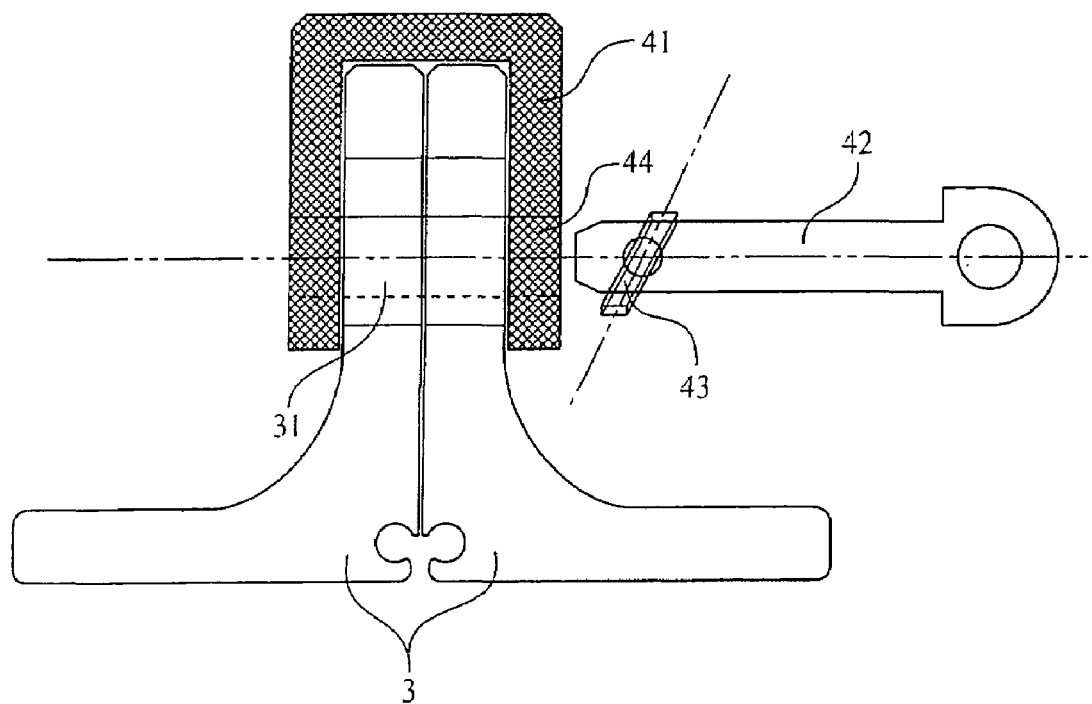
FIG. 5H is an elevation view showing one possible manner of fastening two adjoining panel beams.

One technique for fastening net panels together is shown in FIG. 5H. A metal U-shaped retainer 41 is slipped over the exterior flanges of mated beams 3 so that a hole 44 in the retainer 41 matches a hole 31 in each of the beams. A metal pin 42 (e.g., stainless steel) is inserted through the holes 44 and 31. A spring clip 43 is rotated to lock the pin 42 into place.

The containment pen 1 preferably neutrally buoyant, with buoyancy provided both by the materials used in construction (e.g., use of High Density Polyethylene (HDPE) for beams 3) and/or by fixed foam flotation members 6. The inflatable flotation tubes 5 may be individually inflated by activating valves supplying air through pneumatic lines 11, so that when a particular flotation tube or group of tubes is inflated, the pen rotates to bring the selected net panel or group of net panels to the surface of the water (or to the top of the pen if the entire pen is submerged). Depending on which flotation tubes 5 are inflated, the net pen 1 can be oriented so that generally any net panel 2 can be selectively moved to the surface of the water (or to the topmost position if the pen is fully submerged). Other techniques can also be used to rotate the pen.

An advantage of being able to rotate any given net panel 2 to the surface of the water (or a top orientation) is that the operator of the containment pen can then inspect, remove, replace, clean, and maintain all of the net panels from the surface without having to dive below the surface of the water. Also, bringing different sections of the pen above water periodically will reduce the amount of fouling of the nets from marine organisms.

Figure 6:
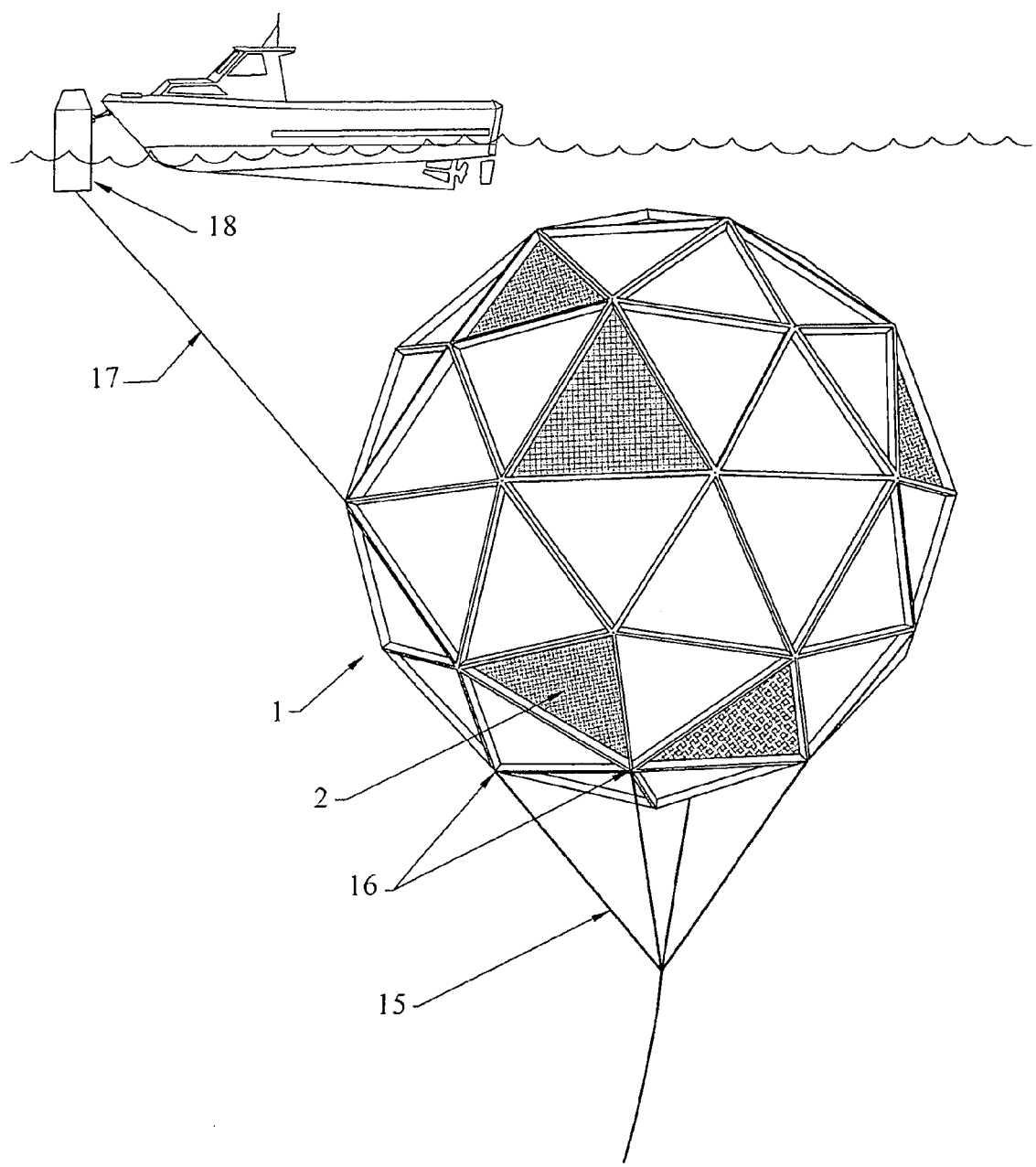
FIGS. 6-6A are perspective views of a containment pen submerged and at the surface.
Figure 6A:
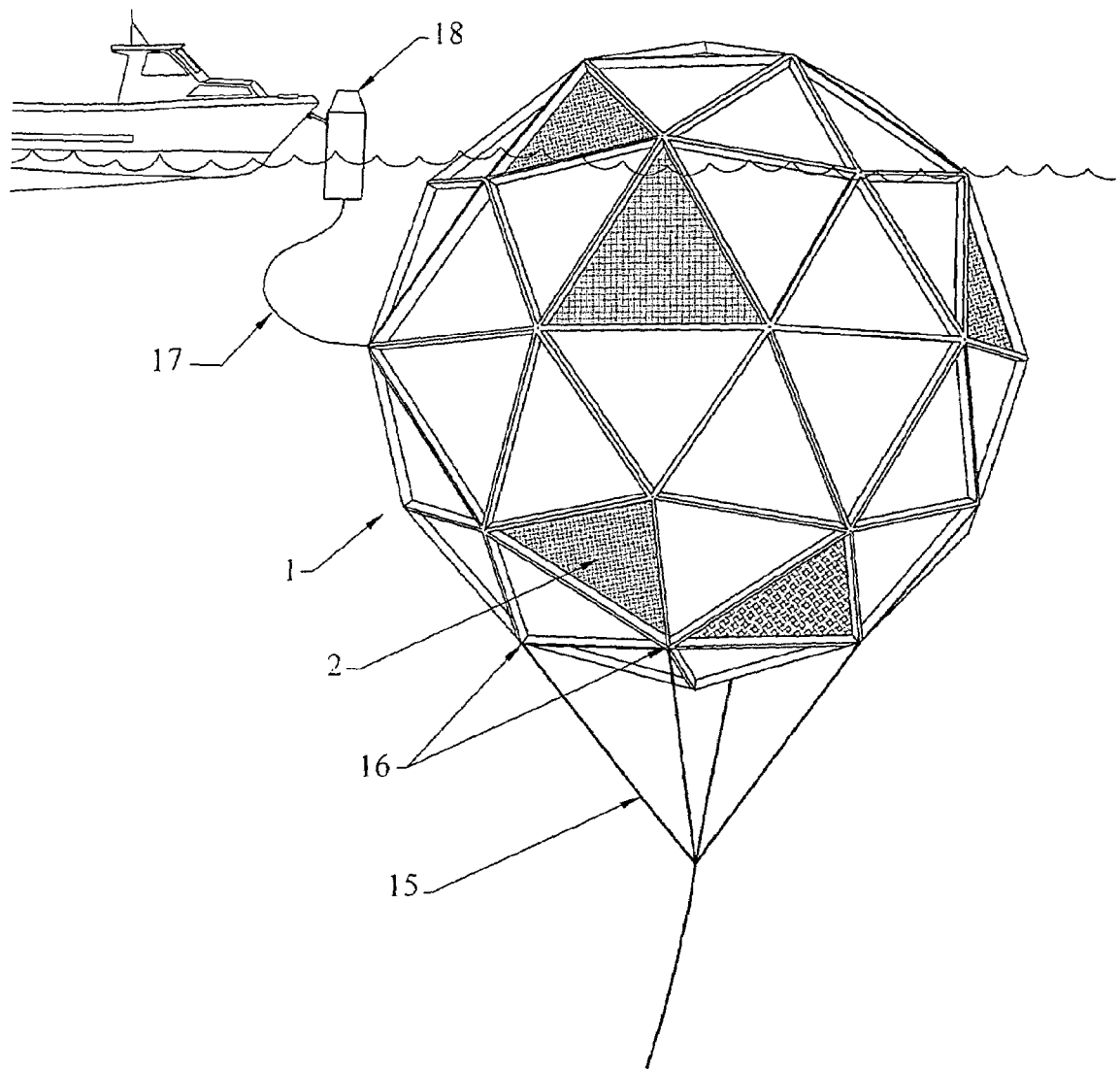

The containment pen can be operated either fully submerged below the surface of the water or partially submerged. If the pen is outfitted with inflatable flotation tubes 5, they can be used to help raise and lower the pen from a submerged to a partially submerged position. FIG. 6 shows one option for mooring a single net pen 1. Mooring lines 15 can be attached to any number of net panel 2 junctions or hubs 16 to distribute the load forces over a wide area. In the implementation shown in FIG. 1, in which there are 80 net panels, there are 32 hubs 16, any of which can be used for mooring. If the net pen were to be rotated, the mooring lines would be relocated to the hubs 16 appropriate to whichever net panel 2 was brought to the topmost position. FIG. 6 also shows the bundled umbilical cord 17 through which feed, compressed air, and electrical cabling (e.g., for cameras or sensors) flows to the net pen 1. The umbilical cord goes from the net pen 1 to a surface buoy 18. The surface buoy 18 or similar device provides the electrical cables, compressed air, and feed for the net pen 1. FIG. 6A shows the same single point mooring with the net pen at the surface, only partially submerged. The single point mooring technique could also be used if a single net pen were being towed by another vessel.

Figure 7:
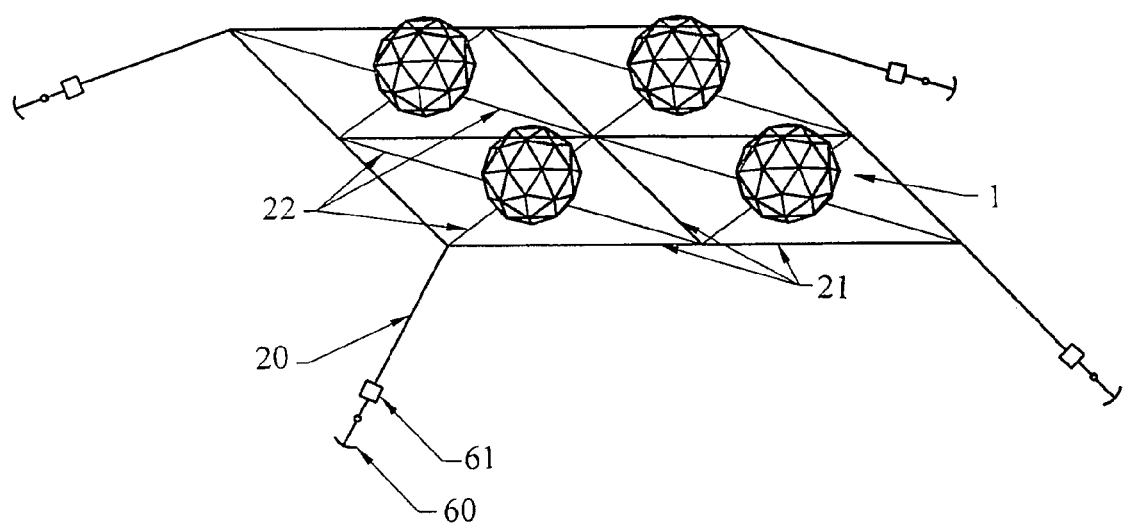
FIG. 7 is a perspective view of four containment pens secured to a mooring grid.

It is anticipated that in many situations multiple net pens will be installed in nearby locations. In this case, the single point mooring shown in FIG. 6 would typically be replaced with a mooring arrangement such as shown in FIG. 7, wherein a fixed submerged grid 21 is held in tension by the anchors 60, mooring blocks 61, anchor lines 20. The pens are attached to the grid by mooring lines 22. The net pens are normally attached to the grid 21 by four mooring lines 22. When conditions permit, two opposing mooring lines 22 can be dropped, and the net pen rotated on an axis formed by the remaining two mooring lines 22. The pens an be rotated in many orientations by selecting which pair of mooring lines to leave attached. In this way, an operator may generally bring any net panel to the surface.

The containment pens could also be operated as free drifting systems without moorings, or as semi-drifting systems attached to a motorized vessel.

Figure 8A:
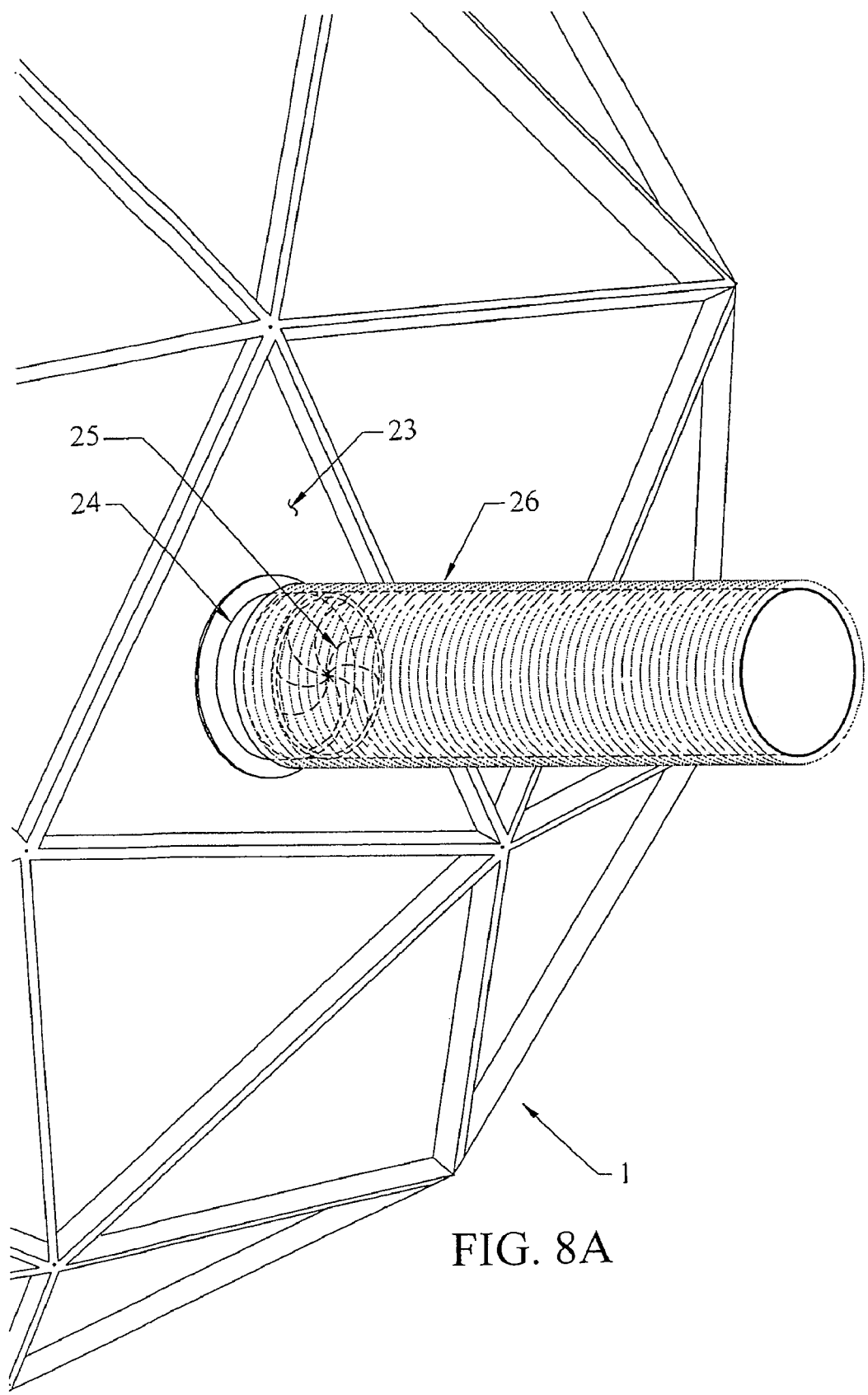
FIG. 8A is a perspective view of a fish transfer apparatus that can be used with the containment pens.
Figure 8B:
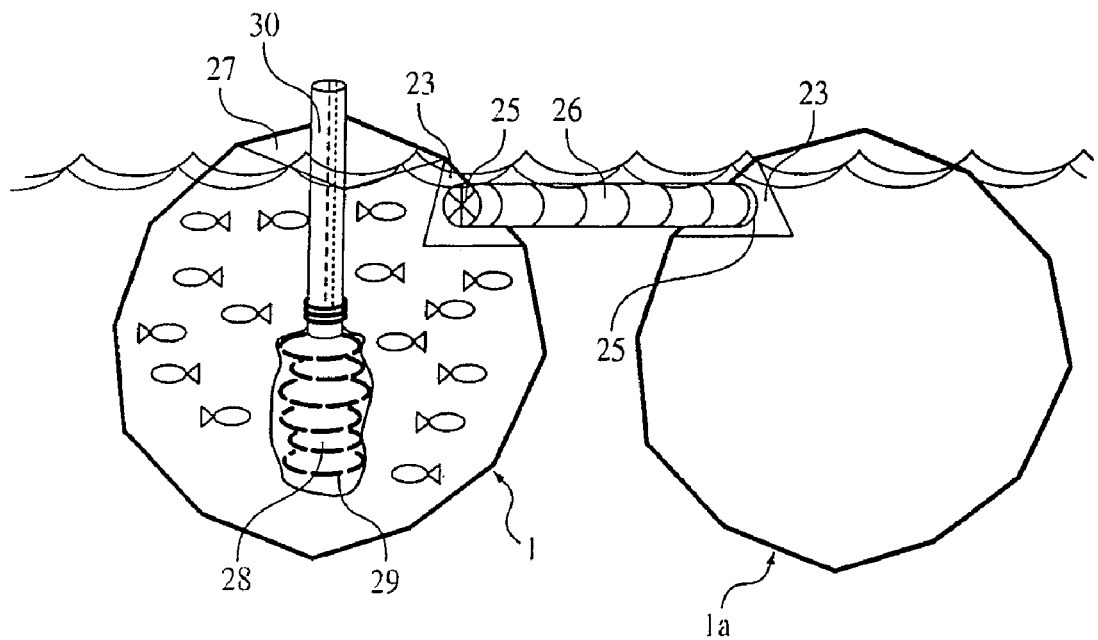
FIGS. 8B-8I are diagrammatic views illustrating a fish transfer operation using the transfer apparatus of FIG. 8A.
Figure 8C:
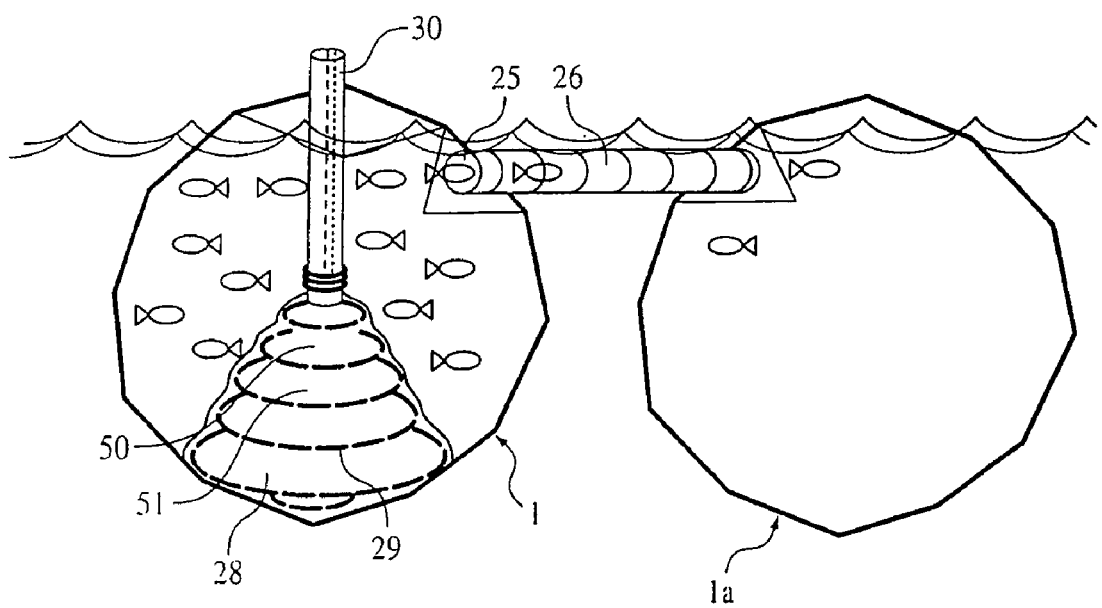
Figure 8D:
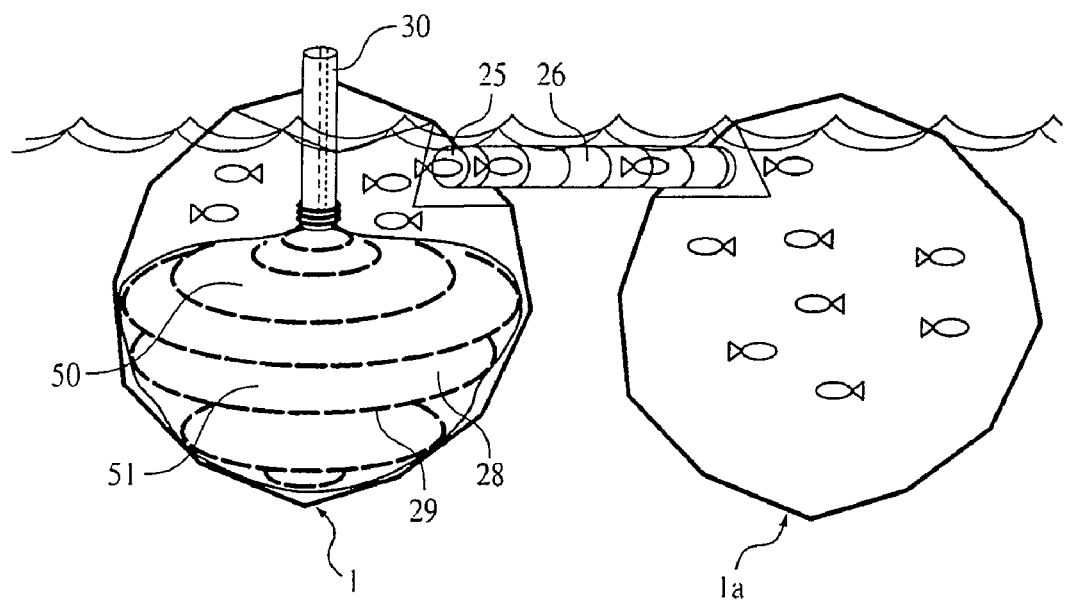

Finfish aquaculture requires periodic handling of fish for transfer between pens, grading for size distribution, inventory, and harvesting. These activities as currently practiced are usually stressful on the animals, causing injury and loss of growth. The containment pens shown in the figures, owing to their modular external structure, lend themselves to the transfer of fish between net pens or into a harvesting pump with minimal stress. FIG. 8A shows a single panel 23 that has been modified to form a transfer link between two net pens or between a single net pen and a harvest pump. Instead of there being netting 4 installed in panel 23, a substantially rigid material is installed, to support a collar 24 that extends outward from the panel. Internal to the collar 24 is a gating device 25, e.g., an iris diaphragm, which controls the passage of fish. In FIG. 8*a* the iris diaphragm 25 is closed. The gating device 25 can be pneumatically controlled by the operator at the surface. One end of a transfer tube 26 is attached to the collar 24, and the other end of the transfer tube 26 is attached to a similar collar on a second pen, or to a fish harvest pump. A transfer sequence, in which fish are moved under their own locomotion from one pen to another, is illustrated diagrammatically in FIGS. 8A-8F. In FIG. 8B, one or more panels 27 at the top of one pen have been modified to accept a packaged inflatable displacement balloon 28, which can be filled with air or water by the operator at the surface. In FIG. 8B the deflated balloon 28 has been lowered into the net pen suspended from the tube 30, which contains lines for air and water. The pen 1 containing the balloon has been attached to a second pen 1*a* via a transfer tube 26 as described in the above paragraph. When it is time to transfer fish, the operator opens the gate 25 in both net pens, as shown in FIG. 8C. The balloon 28 is slowly inflated with air 50, water 51, or a combination of air and water. Filling the top portion of the displacement balloon 28 with air will lift the balloon 28 as it fills. Balloon 28 may be fitted with circumferential flexible weighted rings 29, which ballast the balloon as it fills. As the balloon 28 slowly inflates the available swimming volume in net pen 1 decreases. Fish naturally migrate to less crowded spaces, and will swim through the transfer tube 26 into net pen 1*a* as shown in FIG. 8D. A grading panel in the transfer tube (not shown) would allow smaller fish to pass through to net pen 1*a* while retaining larger fish in net pen 1. Likewise, the transfer tube could contain fish counting and biomass estimation devices.

Figure 8E:
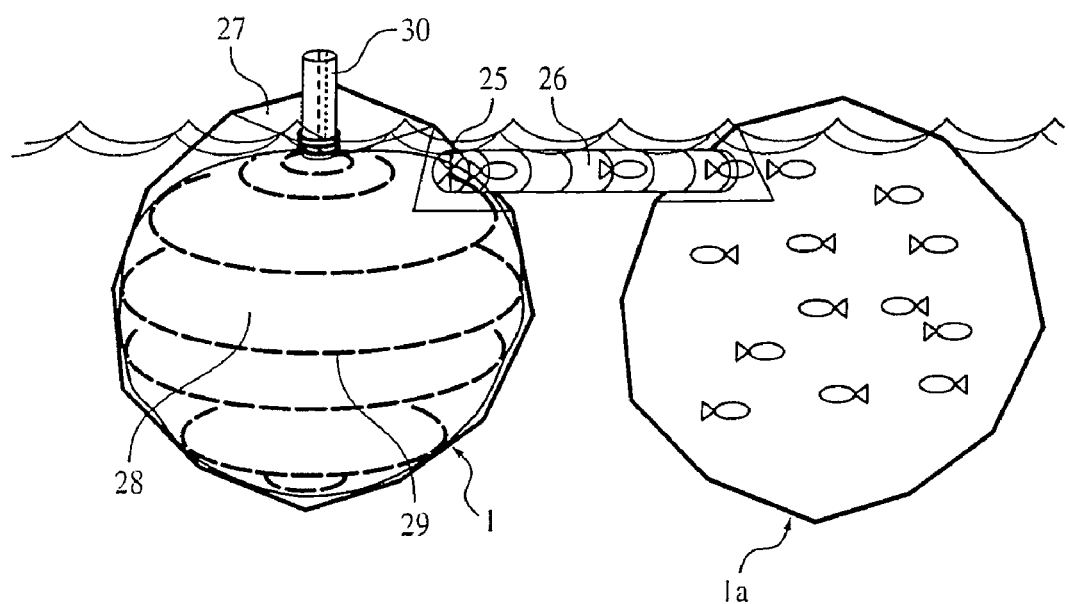
Figure 8F:
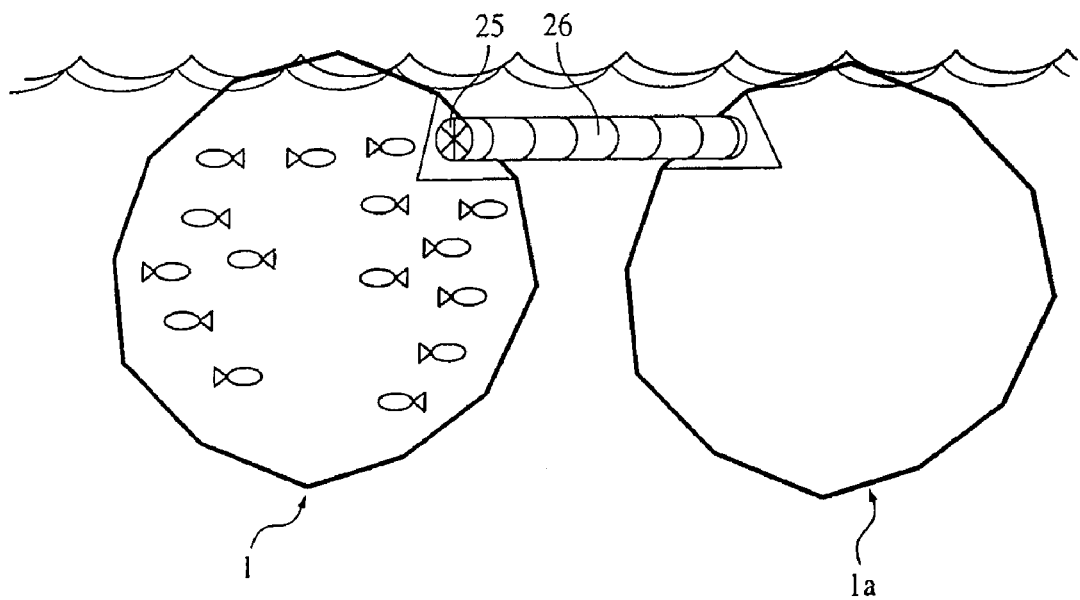
Figure 8G:
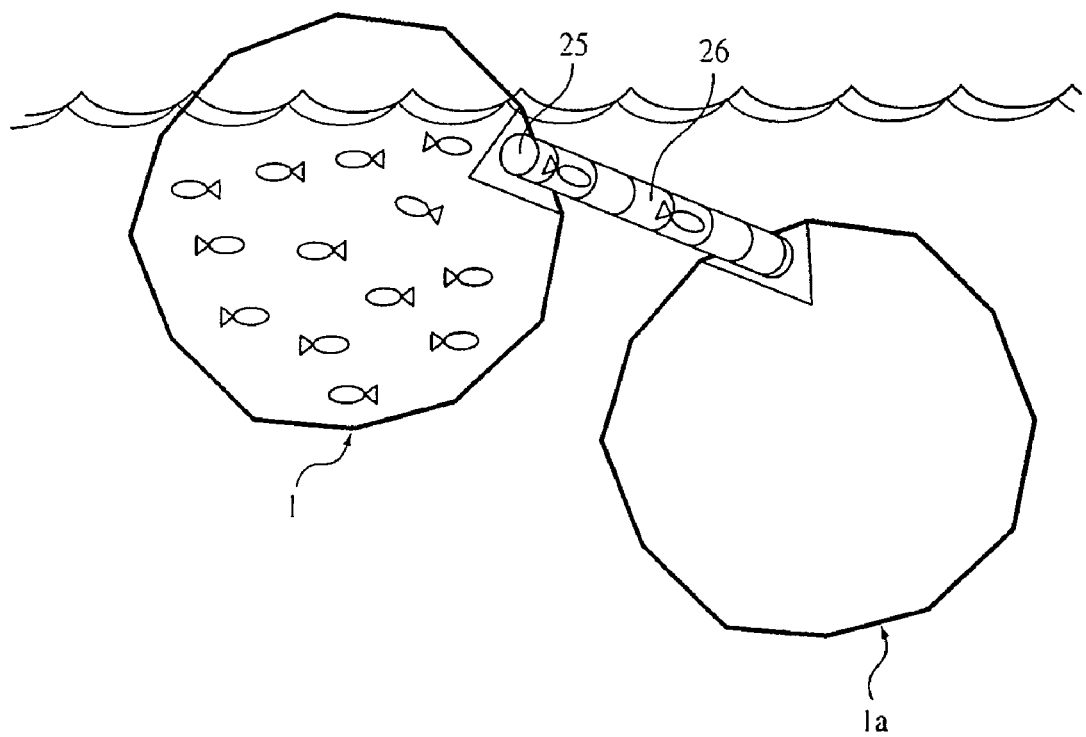
Figure 8H:
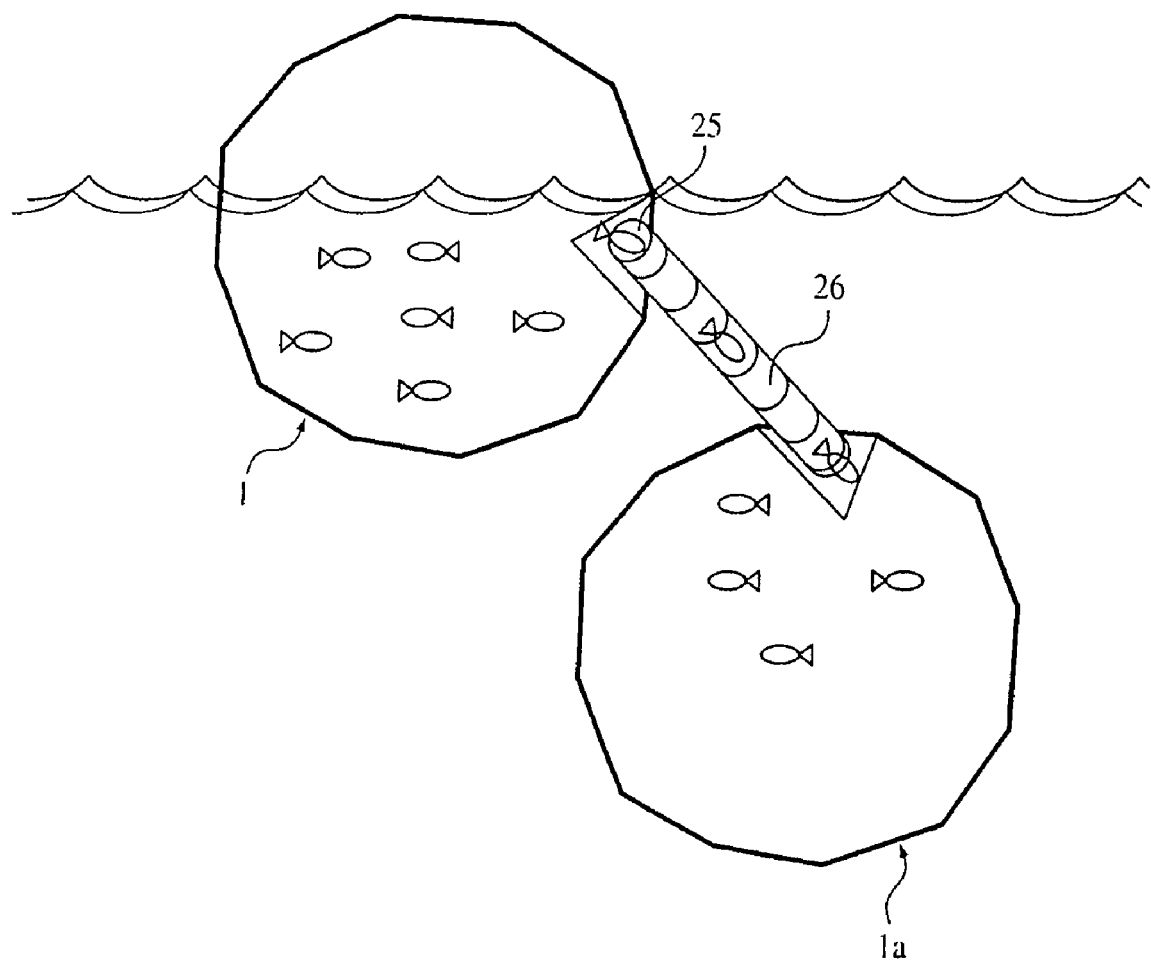
Figure 8I:
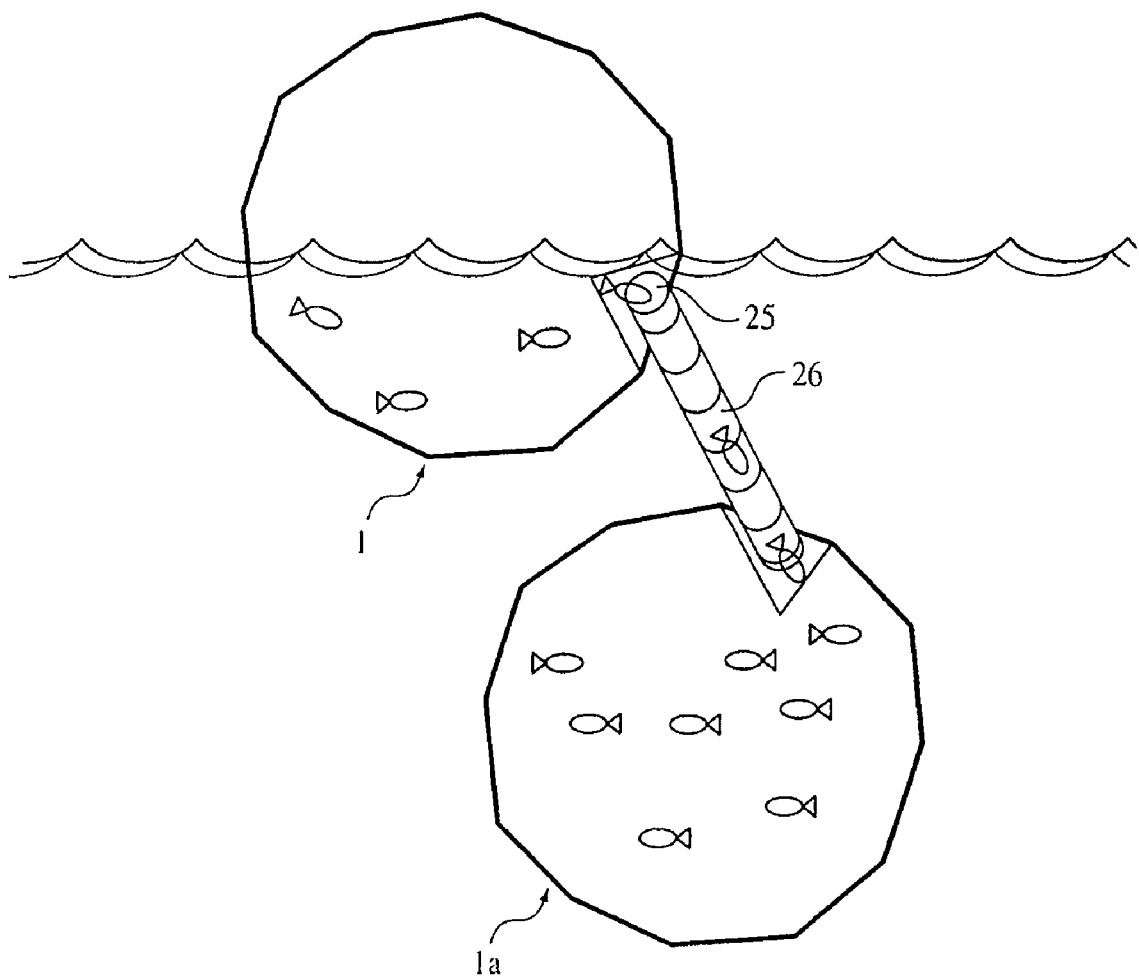

At the end of the transfer process, or when the appropriate number of fish have been transferred or harvested, the operator may close the gate 25 in both net pens as suggested in FIG. 8E. The transfer tube 26 can then be removed, and the balloon 28 deflated and retracted into panel group 27. Panel group 27 can then be removed for service and repackaging.

An alternate transfer sequence is shown in FIGS. 8F-8I wherein pen 1*a* is attached to pen 1 with a transfer link as above. The operator opens the gates 25 in both pens, then raises pen 1 to the surface by adding buoyancy. As pen 1 rises out of the water, fish swim through the transfer link into pen 1*a*.

Figure 9:
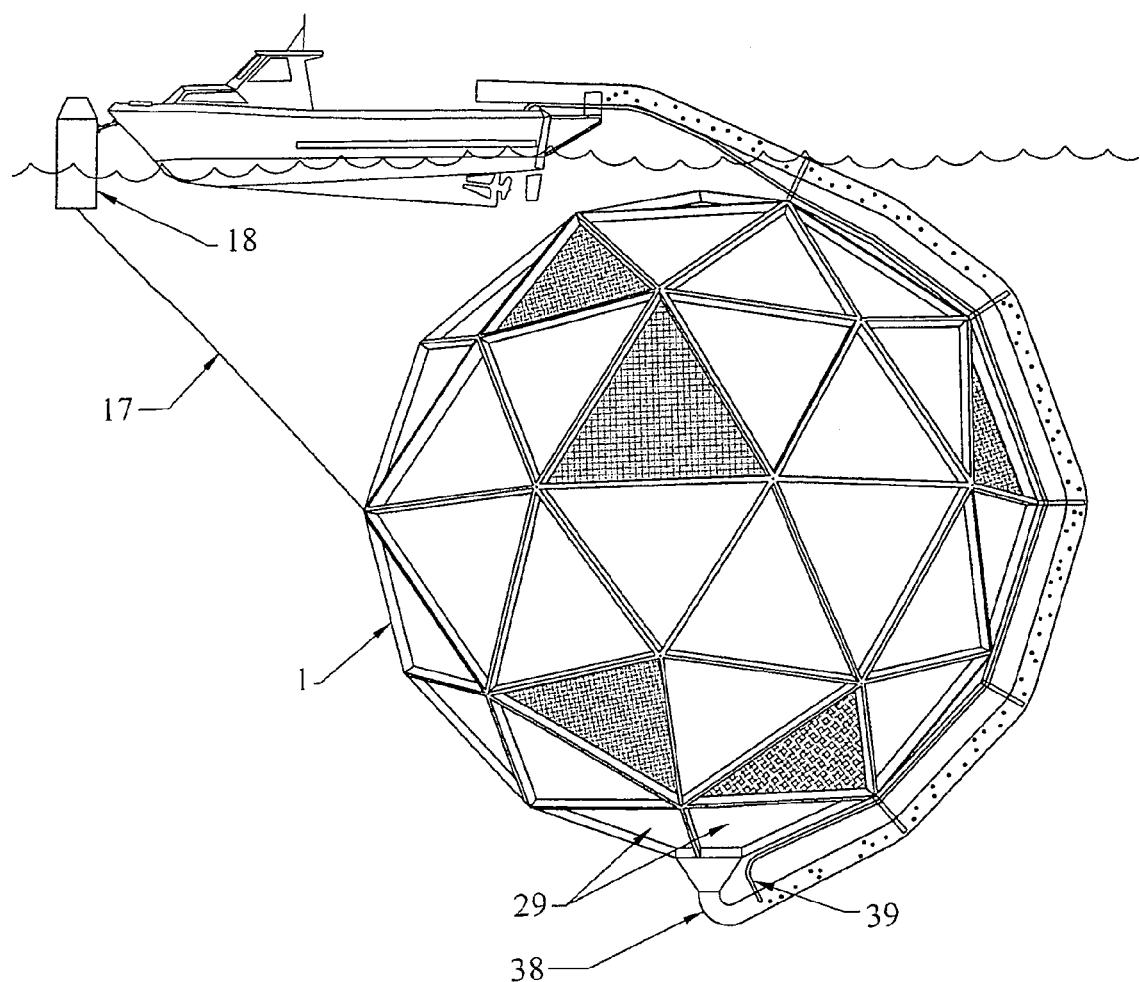
FIG. 9 is a perspective view of a containment pen configured for collection and removal of organic detritus from the bottom of the pen.

The modular nature of the containment pen described allows for individual net panels to take on many functions, and to be removed and replaced as the functions change. Individual panels or groups of panels may be modified for access, feeding, harvest, mooring, flotation, and collection of detritus from the bottom of the net pen. For example, FIG. 9 shows a collection device for collecting dead fish and feces from the bottom of the pen. A group of panels 29 has been modified at the bottom to funnel organic waste into a collection tube 38. At location 39 compressed air is forced into tube 30 such that an uplift is caused, forcing a vacuum effect bringing to the surface the organic detritus which has collected at the bottom of the net pen.

Figure 10:
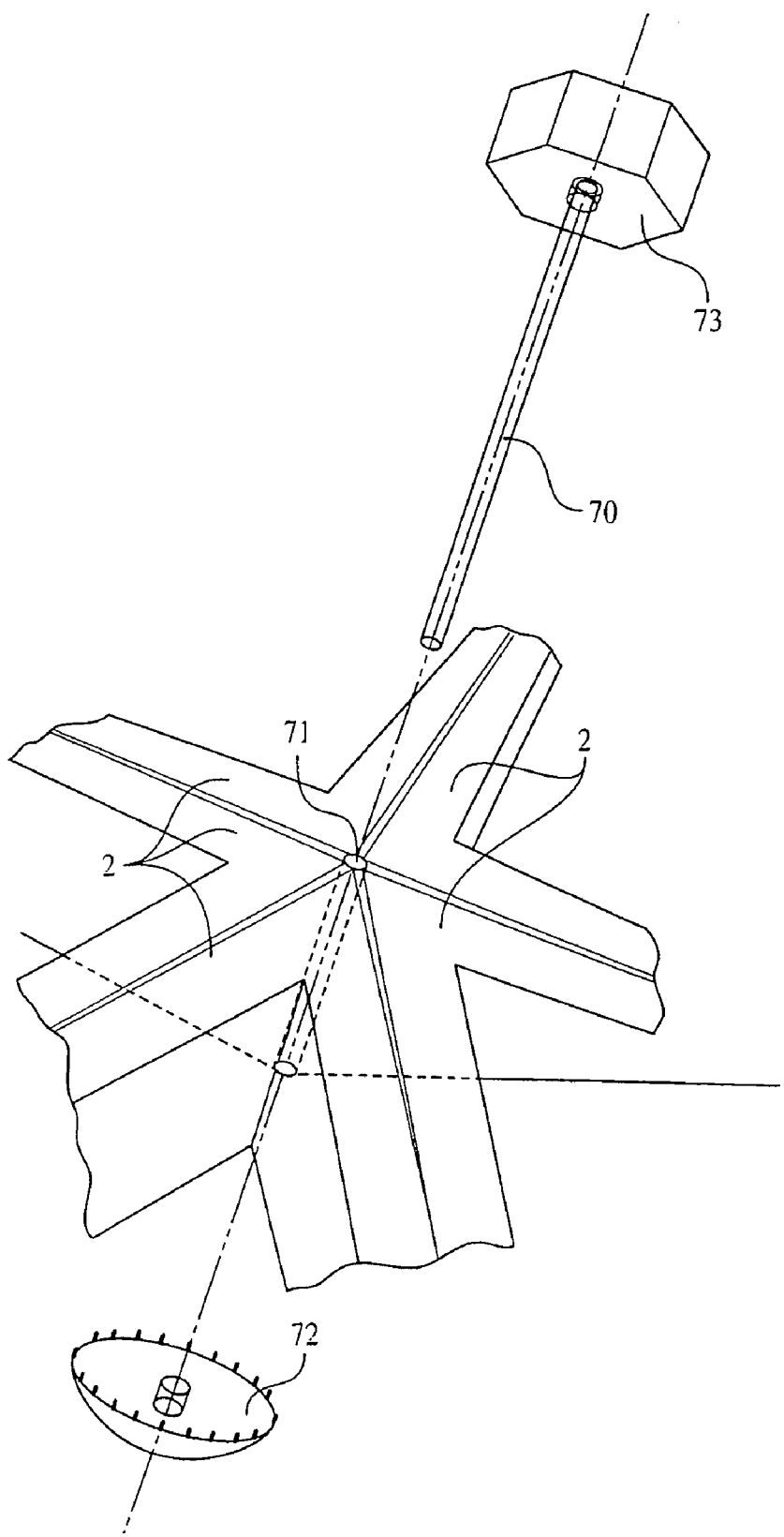
FIG. 10 is a perspective view of the junction between five panels, and the installation of a rounded member at the junction to protect the fish in the vicinity of the junction.

In the implementations shown in the figures, the hub junctions at which the net panels meet are tight fitting, and may be subject to wear from friction. FIG. 10 shows a possible spool-shaped member 70 which can be installed through a hole 71 at a hub junction. Flange 72 is toothed with appropriate sized teeth to grip the interior of the containment pen, allowing flange 73 to be unscrewed and removed. This allows removal or replacement of any of the net panels 2. The exposed spool end 72 is rounded and smooth to protect the fish within the net pen 1.

Many other implementations of the invention other than those described above are within the invention, which is defined by the following claims. For example, a few of the possibilities are outlined as follows.

In the disclosed implementation, the removable panels serve as structural panels to provide the supporting structure of the pen, and as net panels to provide the netting for fish containment. In some implementations, the removable panels could serve only one or the other of those functions. For example, the net panels might be non-structural, and attached to an underlying structural frame, which, for example, could be a geodesic structure formed in the conventional manner of struts joined at hubs. Alternatively, the removable panels might provide the structure of the containment pen, but not the containment netting, which could be a conventional net hung from the structure.

It is not necessary that the entire surface of the pen be covered by removable net panels, or that the structure of the pen be provided entirely by removable structural panels. E.g., one or more portions of the pen could use a conventional structure in which the structural elements and/or the netting is not divided into removable panels, and only the remaining portions of the pen employ the removable panel features.

The pen could have many shapes and many structural forms; e.g., it need not be a geodesic structure, nor be spherical in shape.

The netting need not be attached to the panels in the manner shown in the figures. Many other attachment techniques are possible. And a single piece of netting might extend across more than one panel.

The netting tension aspects of the invention, in which pieces of netting are attached along their perimeters to one or more substantially rigid members, and tensioned generally across a plane defined by those members, can be practiced without use of the removable panel aspects or other aspects of the invention.

The fish transfer aspects of the invention, in which fish are encouraged by a reduction in available swimming volume to transfer from one pen to another under their own locomotion, can be practiced without use of the removable panel aspects or other aspects of the invention.

The selective flotation aspects of the invention, in which a spherical pen is rotated to an orientation with a selected portion of the pen brought to the surface, can be practiced without the use of the removable panel aspects or other aspects of the invention.

The invention claimed is:

1. A containment pen for finfish aquaculture, comprising
a supporting structure,
a net attached to the supporting structure and defining a containment volume for containing finfish,
wherein the supporting structure and net are configured to form an enclosure of sufficient size to serve as a containment pen for swimming finfish,
wherein the net comprises a multiplicity of removable net panels,
wherein each of the removable net panels comprises a discrete piece of flexible netting attached along its perimeter to one or more substantially rigid beams,
wherein the removable net panels are configured to be removable from the containment pen with the piece of flexible netting remaining attached to the one or more substantially rigid beams,
wherein the multiplicity of net panels provide the supporting structure for a majority of the containment pen,
wherein adjoining net panels are attached by attaching together adjoining beams,
wherein the panels are shaped so that a beam of one panel extends generally parallel to and adjacent a beam of an adjoining panels, and
wherein the net panels are in the shape of a polygon.

2. The containment pen of claim 1 wherein the pen is substantially spherical.

3. The containment pen of claim 2 wherein the pen is a geodesic structure.

4. The containment pen of claim 3 wherein the panels comprise one or more triangular panels making up the geodesic structure.

5. The containment pen of claim 1 wherein the discrete pieces of flexible netting are tensioned generally in a plane defined by the one or more substantially rigid members.

6. The containment pen of claim 1 wherein the net panels are configured so that one or more net panels can be removed, leaving an opening in the containment pen, wherein the perimeter of the opening is defined by the beams of net panels that adjoined the one or more net panels that have been removed.

7. A containment pen for finfish aquaculture, comprising
a supporting structure,
a net attached to the supporting structure and defining a containment volume for containing finfish,
wherein the supporting structure and net are configured to form an enclosure of sufficient size to serve as a containment pen for swimming finfish,
wherein the net comprises a multiplicity of removable net panels,
wherein each of the removable net panels comprises a discrete piece of flexible netting attached along its perimeter to one or more substantially rigid beams,
wherein the removable net panels are configured to be removable from the containment pen with the piece of flexible netting remaining attached to the one or more substantially rigid beams,
wherein the multiplicity of net panels provide the supporting structure for a majority of the containment pen,
wherein adjoining net panels are attached by attaching together adjoining beams,
wherein the panels are shaped so that a beam of one panel extends generally parallel to and adjacent a beam of an adjoining panels, and
wherein the adjoining net panels are attached together by fasteners extending between the adjoining beams, and wherein the fasteners are removable to permit a panel to be removed from the pen.

8. A containment pen for finfish aquaculture, comprising
a supporting structure,
a net attached to the supporting structure and defining a containment volume for containing finfish,
wherein the supporting structure and net are configured to form an enclosure of sufficient size to serve as a containment pen for swimming finfish,
wherein the net comprises a multiplicity of removable net panels,
wherein each of the removable net panels comprises a discrete piece of flexible netting attached along its perimeter to one or more substantially rigid beams,
wherein the removable net panels are configured to be removable from the containment pen with the piece of flexible netting remaining attached to the one or more substantially rigid beams,
wherein the multiplicity of net panels provide the supporting structure for a majority of the containment pen,
wherein adjoining net panels are attached by attaching together adjoining beams,
wherein the panels are shaped so that a beam of one panel extends generally parallel to and adjacent a beam of an adjoining panels, and
wherein the discrete pieces of flexible netting are tensioned generally in a plane defined by the one or more substantially rigid members.

9. A containment pen for finfish aquaculture, comprising
a supporting structure,
a net attached to the supporting structure and defining a containment volume for containing finfish,
wherein the supporting structure and net are configured to form an enclosure of sufficient size to serve as a containment pen for swimming finfish,
wherein the net comprises a multiplicity of removable net panels,
wherein each of the removable net panels comprises a discrete piece of flexible netting attached along its perimeter to one or more substantially rigid beams,
wherein the removable net panels are configured to be removable from the containment pen with the piece of flexible netting remaining attached to the one or more substantially rigid beams,
wherein the multiplicity of net panels provide the supporting structure for a majority of the containment pen,
wherein adjoining net panels are attached by attaching together adjoining beams, and
wherein the panels are shaped so that a beam of one panel extends generally parallel to and adjacent a beam of an adjoining panels, and
wherein the containment pen further comprises flotation members that comprise fixed flotation members sized to provide substantially neutral buoyancy to the containment pen.

* * * * *